(12) United States Patent
Gremillion

(10) Patent No.: US 6,192,792 B1
(45) Date of Patent: Feb. 27, 2001

(54) APPARATUS FOR COOKING REDUCED FAT POULTRY OR MEAT

(76) Inventor: Philip J. Gremillion, 124 Evangeline Dr., Lafayette, LA (US) 70501

(*) Notice: Subject to any disclaimer, the term of this patent is extended or adjusted under 35 U.S.C. 154(b) by 0 days.

(21) Appl. No.: 09/361,920

(22) Filed: Jul. 27, 1999

(51) Int. Cl.⁷ ..................................... A47J 43/18
(52) U.S. Cl. ..................... 99/426; 99/347; 99/419; 99/446
(58) Field of Search .............. 99/419, 426, 421, 99/446, 347

(56) References Cited

U.S. PATENT DOCUMENTS

| | | | |
|---|---|---|---|
| 2,821,904 | 2/1958 | Arcabosso | 99/346 |
| 3,392,665 | 7/1968 | Harnest | 99/426 |
| 3,713,378 | 1/1973 | West | 99/346 |
| 4,027,583 | 6/1977 | Spanek | 99/421 |
| 4,450,759 | 5/1984 | Steibel | 99/419 |
| 4,558,197 | * 12/1985 | Wyatt | 99/419 |
| 4,633,773 | 1/1987 | Jay | 99/426 |
| 4,709,626 | 12/1987 | Hamlyn | 99/426 |
| 4,873,922 | * 10/1989 | Umholtz | 99/426 |
| 5,081,916 | 1/1992 | Kuhling | 99/419 |
| 5,106,642 | 4/1992 | Ciofalo | 426/509 |
| 5,301,602 | 4/1994 | Ryczek | 99/345 |
| 5,893,320 | 4/1999 | Demaree | 99/419 |

OTHER PUBLICATIONS

Printed Web Site of Texas Two Step Chicken Cooker http://www.texas2step.com/instruct/index/htm Accessed on May 20, 1999.
Printed Web Site of Tipsy Chicken Cooker http://www.tipsychicken.com/ Accessed on Jul. 27, 1999.

* cited by examiner

Primary Examiner—Gabrielle Brouillette
Assistant Examiner—Hao Mai
(74) Attorney, Agent, or Firm—Domingue & Waddell, PLC

(57) ABSTRACT

An integrated poultry and meat cooking apparatus is provided having a collecting pan and a vertical steaming tube permanently fixed thereto upon which the poultry or meat is supported in an upright position during cooking. The steaming tube has a well which contains liquid seasonings, such as water, beer or wine. During cooking, the fatty juices in the poultry or meat are secreted out of and away from the poultry or meat because of its upright position and are collected in the collecting pan. The liquid seasonings in the steaming tube are vaporized and enter the poultry or meat to replace the loss of the fatty juices and thereby maintain the moistness of the poultry or meat while adding flavor.

6 Claims, 3 Drawing Sheets

APPARATUS FOR COOKING REDUCED FAT POULTRY OR MEAT

FIELD OF THE INVENTION

The present invention relates to an apparatus and method for cooking reduced fat poultry and meat. More particularly, the present invention relates to a poultry and meat cooking apparatus having a collecting pan and a vertical steaming tube upon which the poultry or meat is supported in an upright position during cooking. Liquid seasonings, such as beer or wine, are placed into the steaming tube prior to cooking. During cooking, the fatty juices in the poultry or meat are secreted out of and away from the poultry or meat because of its upright position and are collected in the collecting pan. The liquid seasonings in the steaming tube are vaporized and enter the poultry or meat to replace the loss of the fatty juices and thereby maintain the moistness of the poultry or meat while adding flavor.

BACKGROUND OF THE INVENTION

Legend has it that hobos who were lucky enough to come across a whole chicken devised a way to cook the whole chicken over a camp fire using a half-full can of beer. The beer can was placed in the hot coals of a camp fire and the internal cavity of the dressed whole chicken was inserted over the beer can. The beer can supported the chicken in an upright position over the coals while it cooked. The steam created by the boiling beer, which poached the chicken from within, kept the chicken moist and added flavor. Using this age old practice, various poultry cookers have been developed with a vertical support element containing a reservoir for liquid seasonings, such as beer and wine.

U.S. Pat. No. 5,301,602 discloses such a vertical roasting apparatus for poultry or meat. The apparatus includes a shallow roasting pan, a cantilevered clip member and a vertical, hollow glass support cone. The glass support cone contains a reservoir in which liquids, such as water, wine or other flavoring agents are placed. The poultry to be cooked is placed vertically on the glass support cone. During cooking, the liquid in the reservoir steams and poaches the poultry from the inside while fat from the poultry drips into the roasting pan. In an alternative embodiment, the roasting pan has a bell shaped opening which supports the glass support cone.

The roasting apparatus disclosed in U.S. Pat. No. 5,301,602 suffers from several drawbacks. For example, the use of separate, detachable components which are intricate in design makes the apparatus costly to manufacture. Also, the detachable components can be lost or destroyed thereby rendering the apparatus ineffective. Other vertical poultry cookers having these same or similar disadvantages are shown in U.S. Pat. Nos. 2,821,904 and 5,893,320.

The poultry and meat cooking apparatus of the present invention overcomes the drawbacks associated with prior poultry roasters by providing an integrated cooking apparatus which is less costly to manufacture and which contains no detachable parts that may be lost or destroyed.

SUMMARY OF THE INVENTION

The present invention provides an improved poultry and meat cooking apparatus with no detachable components. The poultry and meat cooking apparatus of the present invention has a collecting pan with a bottom plate and a perpendicular sidewall extending around the outer circumference thereof. The bottom plate and sidewall create an area of sufficient size and volume to collect the fatty juices secreted by the poultry when it is cooked. At least one cylindrical steaming tube is centrally positioned on the bottom plate and extends perpendicular thereto. The steaming tube has a proximal end which is permanently fixed to the bottom plate and a distal end which has an opening adapted to receive a liquid seasoning. The steaming tube has an outer surface capable of supporting the poultry in a vertical, upright position during cooking and an inner surface that forms a well for the placement of the liquid seasoning.

Because the poultry is cooked in a vertical, upright position, the fatty juices from the poultry drip into the collecting pan thus ensuring that the poultry is not cooked in its own fat. The rendering of the fatty juices from the poultry makes the cooked poultry substantially fat-free when compared to poultry that is cooked in its own fat drippings.

Given the loss of fatty juices, to ensure that the cooked poultry is moist and flavorful, liquid seasoning is placed in the steaming tube prior to inserting the poultry there over. While the poultry is cooking, the heat from the cooking element (e.g. stove, campfire, grill) also causes the liquid seasoning to vaporize or turn into steam which then penetrates into the internal cavity of the poultry adding moisture and flavor thereto. Additionally, the steam poaches the poultry and thus decreases the overall cooking time.

The poultry and meat cooking apparatus of the present invention may be made of heat conductive material such as metal. Where the poultry and meat cooking apparatus is metal, the improved integrated design is achieved by welding the steaming tube to the bottom plate of the collecting pan thereby permanently fixing the two components together to form a liquid tight well which holds the liquid seasoning. In another embodiment of the present invention, the proximal end of the steaming tube is sealed with an end cap to form the liquid tight well prior to its fixation to the bottom plate. To permanently fix the steaming tube to the bottom plate, a small hole is made in the center of the bottom plate. The steaming tube is then centrally positioned on the opening of the bottom plate and from the underside of the bottom plate, a plug is welded in the opening which permanently fixes the steaming tube to the bottom plate.

The poultry and meat cooking apparatus of the present invention may also have one or more vertical spikes each adapted to receive a vegetable such as a potato or corn which is then cooked together with the poultry.

The poultry and meat cooking apparatus of the present invention may also have two or more steaming tubes centrally positioned about the bottom plate of the collecting pan.

The poultry and meat cooking apparatus of the present invention may also be used to cook other meat besides poultry, as for example, a roast.

The present invention also provides an improved method of cooking poultry or meat using the aforesaid poultry and meat cooking apparatus.

DETAILED DESCRIPTION OF THE PREFERRED EMBODIMENTS

Figure 1:
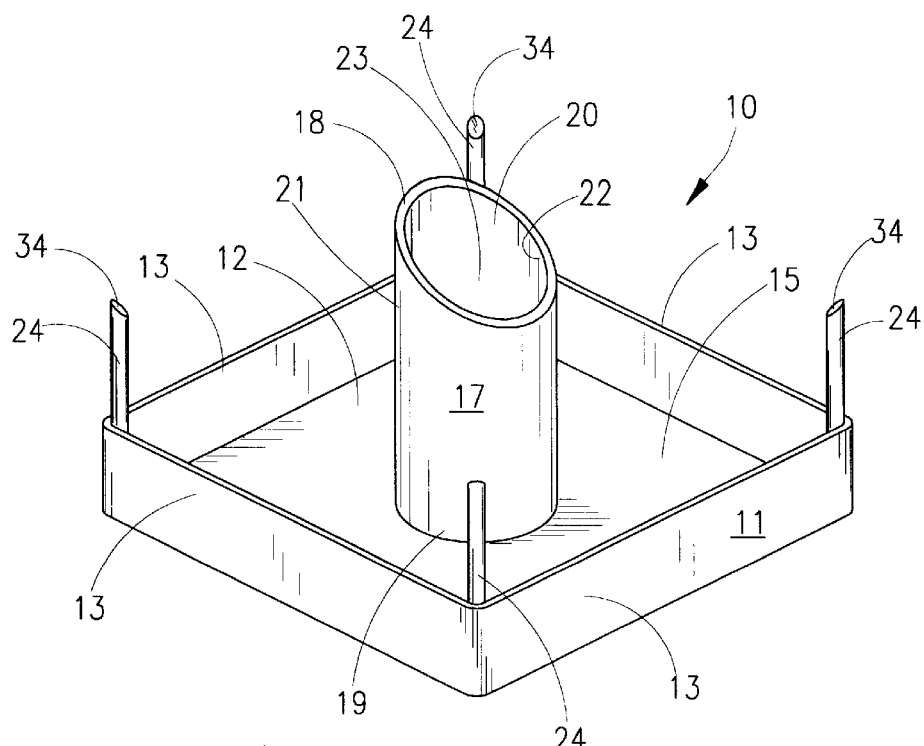
FIG. 1 is an isometric view of a first embodiment of the poultry and meat cooking apparatus of the present invention showing a square collecting pan and one steaming tube.

With reference to the figures where like elements have been given like numerical designation to facilitate an understanding of the present invention, and particularly with reference to the embodiment of the poultry and meat cooking apparatus of the present invention illustrated in FIG. 1, the poultry and meat cooking apparatus 10 may have a collecting pan 11 and vertical steaming tube 17.

Again with reference to FIGS. 1 and 3, collecting pan 11 preferably has a bottom plate 12 and a perpendicular sidewall 13 which may extend around outer circumference 14 of bottom plate 12. Bottom plate 12 and sidewall 13 together may define or form an area 15 of sufficient size and volume to collect fatty juices or fat drippings 37 from poultry 16.

It is to be understood that collecting pan 11 may be configured in a variety of shapes and sizes so long as it functions to collect the fat drippings from poultry 16 without overflowing. For example, collecting pan 11 may be square, rectangular or circular. In the embodiment shown in FIG. 1, collecting pan 11 is square with dimensions of 8"×8"×1¼".

Figure 3:
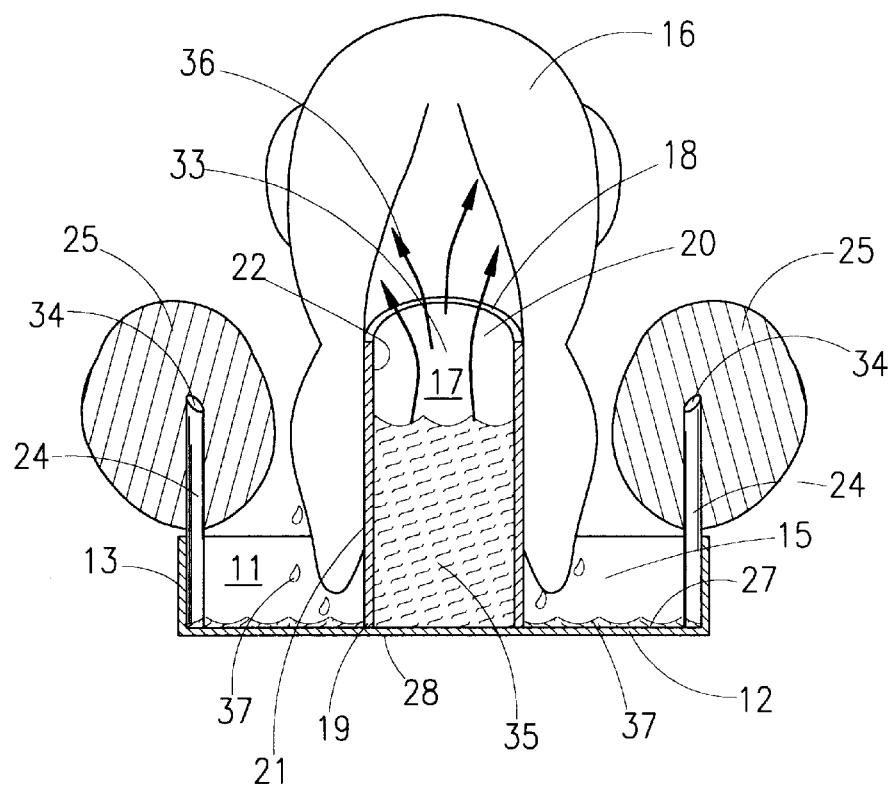
FIG. 3 is a cross sectional side view of the first embodiment of the poultry and meat cooking apparatus of the present invention.

As further illustrated in FIGS. 1 and 3, at least one cylindrical steaming tube 17 is centrally positioned on bottom plate 12. Preferably, steaming tube 17 extends perpendicularly to bottom plate 12. Steaming tube 17 may have a proximal end 19 which is permanently fixed to bottom plate 12 to form inner surface 22. Inner surface 22 defines or forms a well 23 which may hold a liquid seasoning 35. Steaming tube 17 may also have a distal end 18 which may have an opening 20. Opening 20 is preferably adapted to receive the liquid seasoning 35, such as water, beer, wine or other flavoring agent, for containment in well 23.

Again with reference to FIGS. 1 and 3, steaming tube 17 may also have an outer surface 21 that is capable of supporting poultry 16 in a vertical, upright position during cooking operations. In the vertical, upright position, maximum secretion of the fat drippings 37 from poultry 16 is achieved during the cooking process.

As shown in FIGS. 1 and 3, liquid seasoning 35 may be placed in well 23. During the cooking process, the liquid seasoning 35 is vaporized and in this gaseous form, sometimes referred to as steam 36, passes out of steaming tube 17, through opening 20, and penetrates into the internal cavity of poultry 16 adding moisture and flavor thereto. Preferably, steaming tube 17 is about 3 to 18 inches in height and more preferably, 8 inches in height. The diameter of well 23 is preferably from 1 to 4 inches, and more preferably, is about 2 inches in diameter. Again with reference to FIG. 1, opening 20 in distal end 18 of steaming tube 17 may be angled to provide a greater surface area for the vaporized seasoning 36 to penetrate into poultry 16 during cooking. Preferably, the angle is between 20° and 60°. More preferably, the angle is 45°.

As shown in FIGS. 1 and 3, poultry and meat cooking apparatus 10 may also have one or more vertical spikes 24. Spikes 24 are each adapted to receive vegetable 25 to be cooked together with poultry 16. Spikes 24 are preferably positioned on outer circumference 14 of bottom plate 12, adjacent to sidewall 13. Spikes 24 may be permanently fixed to bottom plate 12. Preferably, poultry and meat cooking apparatus 10 has between 1 to 6 spikes 24 and more preferably 4 spikes 24. Spikes 24 are preferably between 1½ inches to 4 inches in height and more preferably are 3 inches in height. Preferably, spikes 24 are ¼ inches in diameter. Spikes 24 may have an angled end 34 which facilitates the piercing of vegetables 25.

Figure 2:
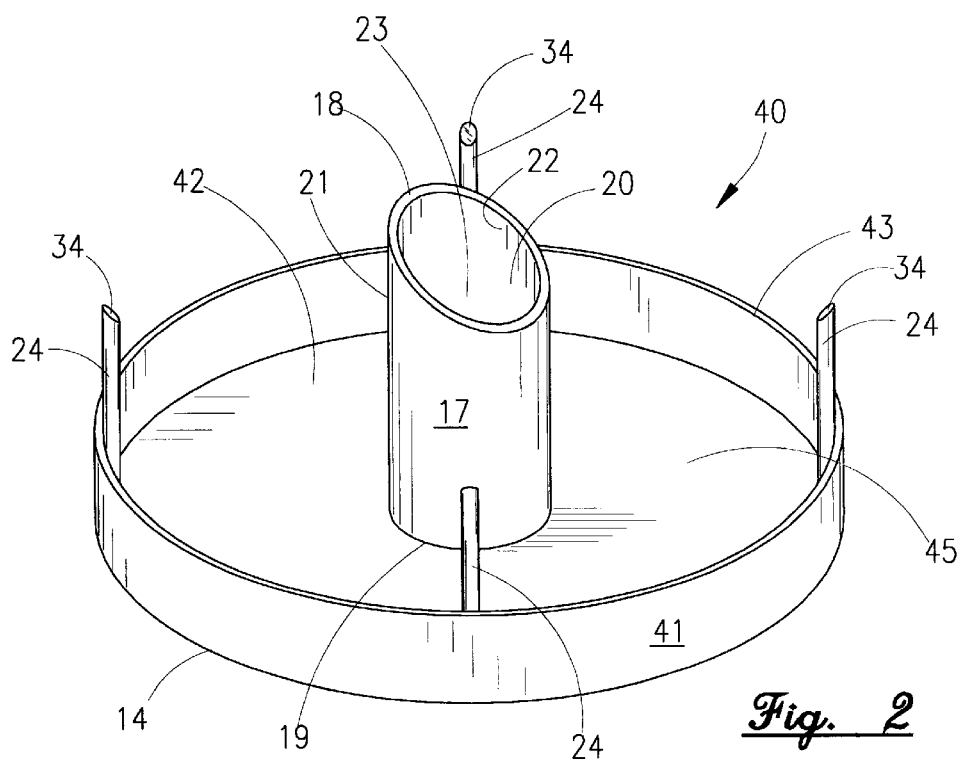
FIG. 2 is an isometric view of a second embodiment of the poultry and meat cooking apparatus of the present invention showing a circular collecting pan and one steaming tube.

As seen in FIG. 2, poultry and meat cooking apparatus 40 may have a collecting pan 41 that is circular. Collecting pan 41 may includes circular bottom plate 42 and perpendicular sidewall 43 which extends around outer circumference 14 of bottom plate 42. The diameter of collecting pan 41 is preferably between 6 to 10 inches and is more preferably 8 inches. The height of sidewall 43 is preferably 1¼ inches.

Figure 4:
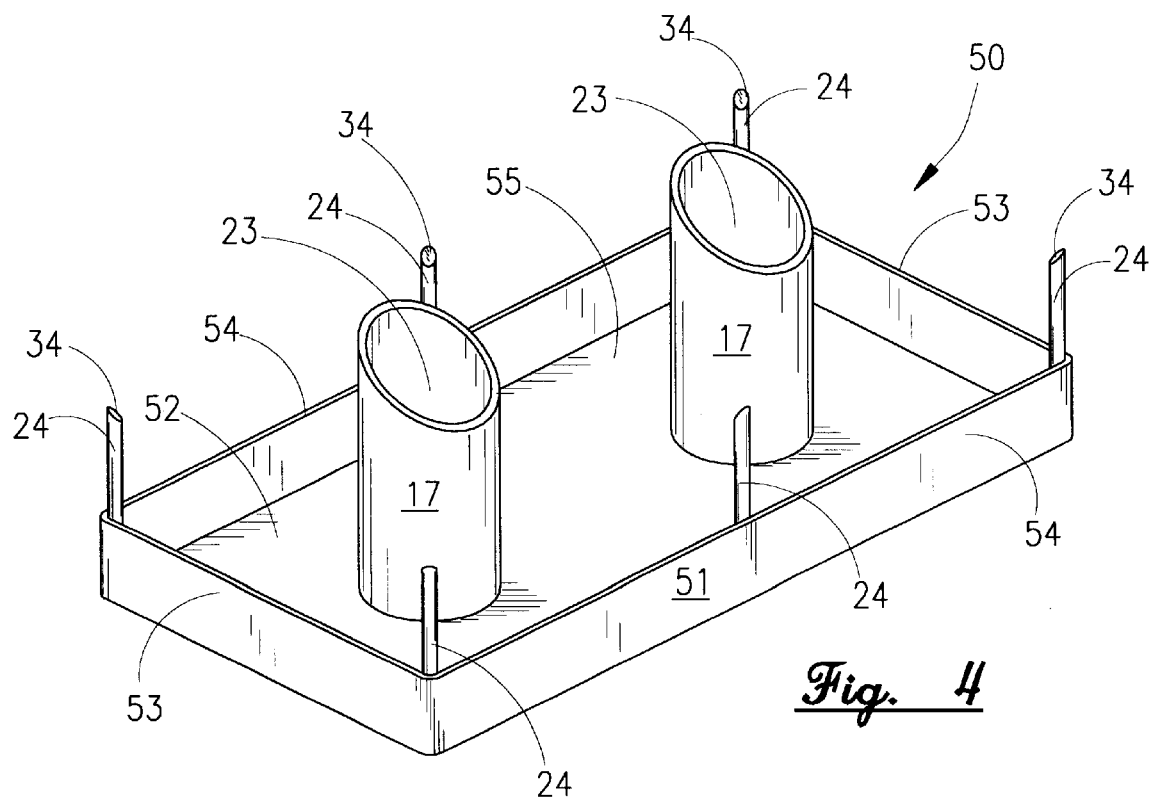
FIG. 4 is an isometric view of a third embodiment of the poultry and meat cooking apparatus of the present invention showing a rectangular collecting pan and two steaming tubes.

Referring to FIG. 4, poultry and meat cooking apparatus 50 may have a collecting pan 51 that is rectangular. Collecting pan 51 include bottom plate 52, perpendicular sidewalls 53 and perpendicular front and back walls 54. Bottom plate 52, sidewalls 53 and front and back walls 54 define or form area 55 that is of sufficient size and volume to collect fat drippings 37 from poultry 16. Collecting pan 51 preferably has the dimensions of 16"×8"×1¼".

Again with reference to FIG. 4, poultry and meat cooking apparatus 50 may have two cylindrical steaming tubes 17 centrally positioned on bottom plate 52. Using the embodiment shown in FIG. 4, two poultries can be cooked at one time.

It is preferred that poultry and meat cooking apparatus 10,40,50 be constructed entirely of a heat conductive material such as ceramic, glass or metal. To achieve the integrated design wherein bottom plate 12,42,52 is permanently fixed to steaming tube 17, the fixing mechanism depends on the material of the poultry and meat cooking apparatus 10,40,50. For example, should poultry and meat cooking apparatus 10,40,50 be made of ceramic or glass, bottom plate 12,42,52 may be molded together with steaming tube 17 such that the components form a unitary structure.

Figure 5:
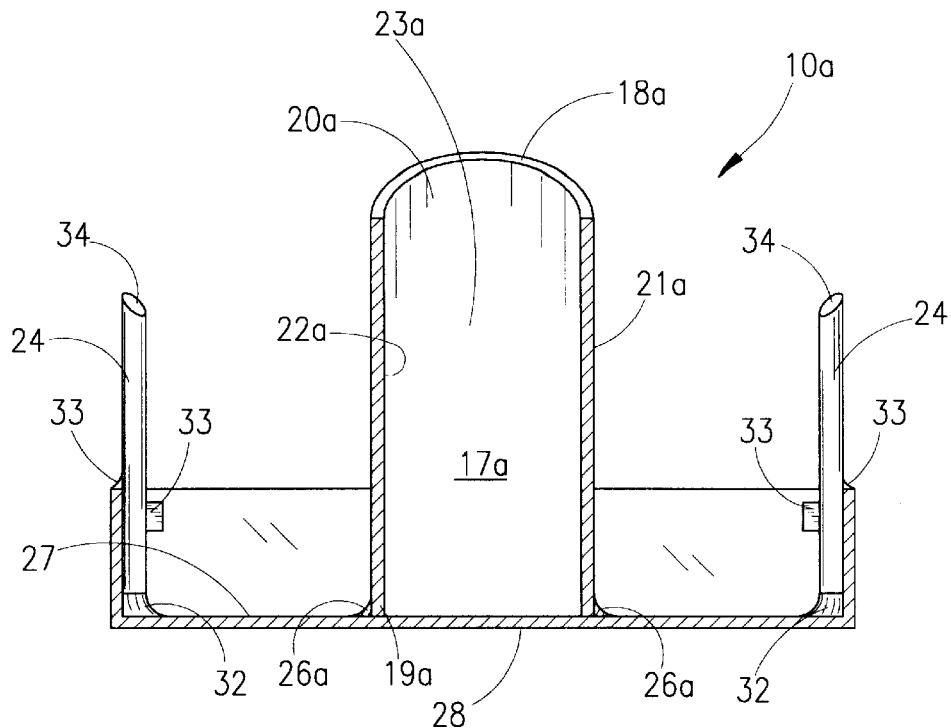
FIG. 5 is a cross sectional side view of an embodiment of the poultry and meat cooking apparatus of the present invention showing the welding of the steaming tube to the upper surface of the bottom plate.

Poultry and meat cooking apparatus 10, including collecting pan 11 and steaming tube 17, are preferably made of a heat conductive material. Preferably, the heat conductive material is metal, such as aluminum. As illustrated in FIG. 5, the integrated design of a poultry and meat cooking apparatus 10a is achieved by welding the components together. Proximal end 19a of steaming tube 17a is preferably permanently fixed to bottom plate 12 by weld 26a. More preferably, bottom plate 12 has an upper surface 27 and a lower surface 28. Proximal end 19a of steaming tube 17a may be permanently fixed to upper surface 27 by weld 26. The fixation of proximal end 19 of steaming tube 17a to upper surface 27 forms a liquid tight well 23a which contains the liquid seasoning 35. Spikes 24 are preferably permanently fixed to bottom plate 12 by weld 32 and to sidewall 13 by weld 33.

Figure 6:
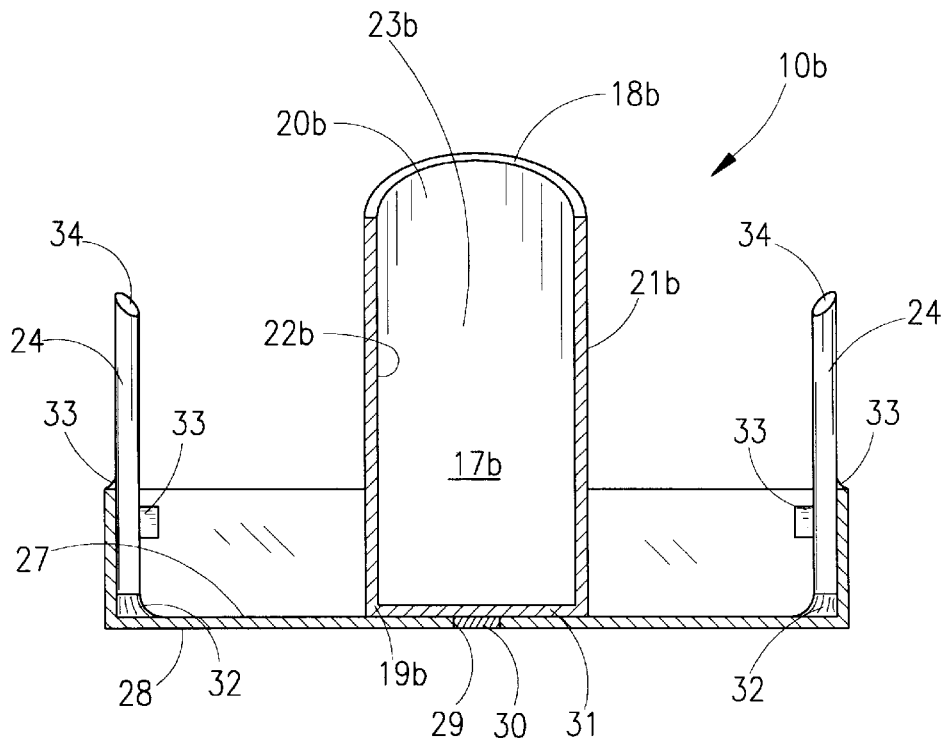
FIG. 6 is a cross sectional side view of an embodiment of the poultry and meat cooking apparatus of the present invention showing the welding of a plug in a central opening in the bottom plate to fix the steaming tube to the bottom plate.

As illustrated in FIG. 6, proximal end 19b of steaming tube 17b is closed by end cap 31 which forms a liquid tight well 23b capable of containing the liquid seasoning 35. A small centrally located hole 29 is provided in bottom plate 12 where steaming tube 17b is to be positioned. Hole 29 is about ½ inch to 1 inch in diameter. Steaming tube 17b is set on bottom plate 12 over hole 29. Hole 29 is filled in by plug 30 which is welded from underneath bottom plate 12 to permanently fix steaming tube 17b, or more accurately end cap 31 of steaming tube 17b, to bottom plate 12. Plug 30 is then ground smooth such that plug 30 appears to be part of lower surface 28 of bottom plate 12. Spikes 24 are preferably permanently fixed to bottom plate 12 by weld 32 and to sidewall 13 by weld 33.

Poultry 16 can be a chicken, turkey or other fowl or any combination thereof, to bake poultry 16 using poultry and meat cooking apparatus 10, poultry and meat cooking apparatus 10 should first be sprayed with a non-stick spray for easier clean-up. Steaming tube 17 should be filled to between ½ and ¾ full of liquid seasoning 35. Examples of liquid seasoning 35 include beer, wine, fruitjuices, or water. Other solid seasoning ingredients can be added to the liquid seasoning 35 including dry spices and seasonings, diced onion, bell pepper or garlic. A whole poultry 16 should be rinsed well and patted dry with a paper towel. The outside of poultry 16 may be seasoned with dry spices, salt or pepper. Poultry 16 should then be placed over steaming tube 17 such that the internal cavity of poultry 16 is inserted over steaming tube 17 as shown in FIG. 3. The legs of poultry 16 may sit in collecting pan 11 and the wings should be folded at its sides. A piece of foil should be tucked over the neck of poultry 16 to seal the cavity. Poultry 16 should be baked in an oven for 1 to 1½ hours at 350° F. or on a barbeque pit, with the top closed, for ½ to 2 hours. To cook vegetables 25 such as potatoes or corn, wrap vegetable 25 in foil and press vegetable 25 onto spikes 24 and bake for approximately 1 hour with poultry 16.

It also is to be understood that meats other than poultry 16 may be cooked using poultry and meat cooking apparatus 10. For example, poultry 16 can be replaced with non-poultry meat such as a roast. For non-poultry meats having no internal cavity, a slit may be made in the non-poultry meat to accommodate steaming tube 17. The non-poultry meat may be placed over steaming tube 17 and cooked either in an oven or in a barbeque pit.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a perusal hereof.

What is claimed is:

1. A poultry and meat cooking apparatus, comprising;
   a collecting pan having a bottom plate and a perpendicular sidewall extending around an outer circumference of said bottom plate, said bottom plate and sidewall defining an area of sufficient size and volume to collect fat drippings from a poultry during a cooking operation without overflow;
   at least one cylindrical steaming tube centrally positioned on said bottom plate of said collecting pan and extending perpendicular thereto, said steaming tube having a proximal end which is permanently fixed to said bottom plate and a distal end having an opening adapted to receive a liquid seasoning, wherein said distal end of said steaming tube containing said opening is angled to provide a greater surface area for said liquid seasoning which vaporizes to penetrate said poultry,
   wherein said steaming tube has an outer surface capable of supporting said poultry in a vertical, upright position during said cooking operations in order to achieve maximum secretion of said fat drippings from said poultry and wherein said permanent fixation of said proximal end of said steaming tube to said bottom plate forms a liquid tight well for a placement of said liquid seasoning which vaporizes during said cooking operations, passes through said opening in said steam tube and penetrates into said poultry to provide moisture and flavor thereto, at least one vertical spike adapted to receive a vegetable to be cooked together with said poultry, said spike being vertically positioned on said outer circumference of said bottom plate and adjacent to said sidewall, wherein said spike is permanently fixed to said bottom plate and sidewall, wherein said collecting pan, said spike, and said steaming tube are each made of a metal.

2. The poultry and meat cooking apparatus according to claim 1, wherein said collecting pan further includes two cylindrical steaming tubes.

3. The poultry and meat cooking apparatus according to claim 1, wherein said proximal end of said steaming tube is permanently fixed to said bottom plate by a weld.

4. The poultry and meat cooking apparatus according to claim 1, wherein said bottom plate has an upper and a lower surface and said proximal end of said steaming tube is permanently fixed to said upper surface of said bottom plate by a weld.

5. The poultry and meat cooking apparatus according to claim 1, wherein said spike is permanently fixed to said bottom plate by a weld and is permanently fixed to said sidewall by a weld.

6. The poultry and meat cooking apparatus, comprising:
   a metal collecting pan having a bottom plate and a perpendicular sidewall extending around an outer circumference of said bottom plate, said bottom plate and sidewall defining an area of sufficient size and volume to collect fat drippings from a poultry during cooking operations without overflow;
   at least one cylindrical metal steaming tube having a proximal end closed by an end cap to form a liquid tight well for containing a liquid seasoning and a distal end having an opening adapted to receive said liquid seasoning,
   wherein said bottom plate has a small centrally located hole over which said end cap of said steaming tube is positioned, said hole being filled with a welded plug that permanently fixes said steaming tube in a vertical alignment to said bottom plate and wherein said steaming tube has an outer surface capable of supporting said poultry in a vertical, upright position during said cooking operations in order to achieve maximum secretion of said fat drippings from said poultry while said liquid seasoning in said well vaporizes, passes through said opening in said distal end of said steaming tube and penetrates into said poultry to provide moisture and flavor thereto;
   at least one vertical spike adapted to receive a vegetable to be cooked together with said poultry, said spike being vertically positioned on said outer circumference of said bottom plate and adjacent to said sidewall and wherein said spike is permanently fixed to said bottom plate and sidewall and wherein said spike is permanently fixed to said bottom plate by a weld and is permanently fixed to said sidewall by a weld and wherein said collecting pan, said spike and said steaming tube are each made of a heat conductive metal.

* * * * *